F. R. BACHLER & W. B. NEWKIRK.
PROCESS OF TREATING LIQUIDS.
APPLICATION FILED DEC. 23, 1915.

1,244,012.

Patented Oct. 23, 1917.

Inventors
Frederick R. Bachler
William B. Newkirk
by Townsend, Graham & Harris
Their Attorneys

UNITED STATES PATENT OFFICE.

FREDERICK R. BACHLER, OF OXNARD, AND WILLIAM B. NEWKIRK, OF LOS ANGELES, CALIFORNIA, ASSIGNORS OF ONE-THIRD TO ALGERNON T. GIBSON, OF OXNARD, CALIFORNIA.

PROCESS OF TREATING LIQUIDS.

1,244,012.

Specification of Letters Patent.  Patented Oct. 23, 1917.

Application filed December 23, 1915. Serial No. 68,451.

*To all whom it may concern:*

Be it known that we, FREDERICK R. BACHLER and WILLIAM B. NEWKIRK, both citizens of the United States, the former residing at Oxnard, in the county of Ventura and State of California, and the latter residing at Los Angeles, in the county of Los Angeles and State of California, have invented a new and useful Process of Treating Liquids, of which the following is a specification.

Our invention relates to a process and apparatus for treating liquids, and the principal object of the invention is to provide a process and apparatus which is especially adapted to purify and decolorize impure sugar solutions. Such solutions carry the sugar which is a crystalloid, and in addition carry certain colloidal impurities, such as pectins, gums, and the like. By our process the colloids are removed from the solution which then has a greater brilliancy, reduced viscosity, and lighter color, due to its reduced organic matter and greater purity. It will, however, be obvious to one skilled in the art that the process and apparatus is applicable to the treatment of other liquids and to the production of other results.

The apparatus which we have used in the treatment of impure sugar solutions is illustrated diagrammatically in the drawings, in which—

Figure 1:
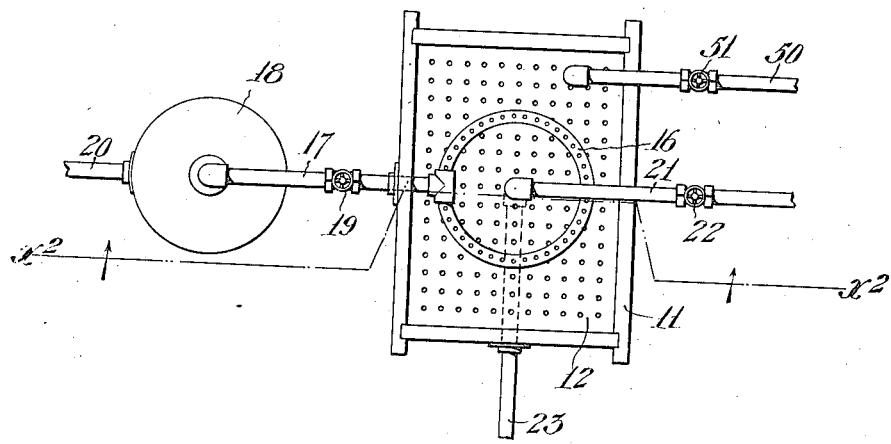
Figure 1 is a plan of the apparatus used.
Figure 2:
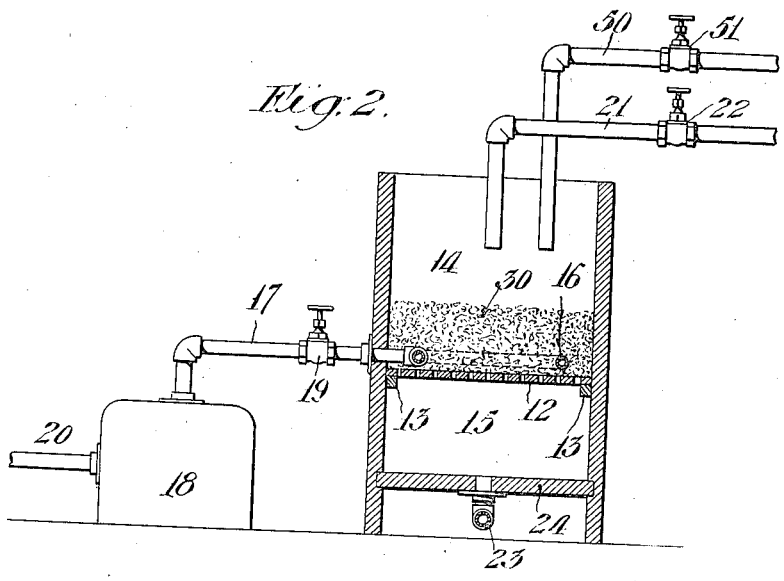
Fig. 2 is an elevation on a plane represented by the line $x^2$ $x^2$ of Fig. 1, as viewed in the direction of the arrows.

In these drawings, a container 11 is illustrated, this container being preferably built of wood, as shown. A perforated diaphragm 12 is supported on blocks 13 inside the container 11 dividing the container into a treating chamber 14 and a decanting chamber 15. Located immediately above the diaphragm 12 is a ring of perforated pipe 16, this pipe communicating through a pipe 17 with a gas generator 18, the flow of gas from the generator 18 through the pipe 17 being controlled by a valve 19. A generator supply pipe 20 is provided through which a primary gas or mixture of gases may be supplied to the generator 18. In the treatment of sugar solutions we supply air through the pipe 20 and generate sulfur dioxid or $SO_2$ in the generator 18, supplying this to the interior of the chamber 14 through the perforated pipe 16, the flow thereof being controlled by the valve 19. Sugar solution is supplied to the container 11 through a supply pipe 21 having a valve 22 therein, and the treated solution is drawn off through an outlet pipe 23 which communicates with the decanting chamber 15 through the bottom 24 of the container 11. Supported on the diaphragm 12, and covering the perforated pipe 16 is a mass of electrode material 30. This mass of electrode material consists preferably of copper and aluminum shavings, these shavings being intimately mixed together and each of them forming a small electrode.

In the treatment of sugar solution, the solution is introduced through the pipe 21 into the treating chamber 14, passing down through the mass of electrode material 30 and through the perforated diaphragm 12 into the decanting chamber 15, being drawn off therefrom through the pipe 23. During its passage through the treating chamber 14, the sugar solution is subjected to the action of $SO_2$ which is forced upwardly through the electrode material being supplied through the perforated pipe 16. As the shavings of aluminum and copper, which we hereinafter designate as the electrodes, are intimately mixed together they form a porous mass through which the sugar solution can circulate. Obviously the electrodes can be of any form or shape. We find that shavings are a convenient form. This porous mass consisting of two materials having different electrical potentials, which we hereinafter call the electrode material in reality forms a plurality of primary cells, the difference in polarity between the electrodes of different material tending to cause electric currents to flow in the sugar solution which forms the electrolyte, these currents completing their circuits through the electrode material itself so that no external connections are necessary. It will be seen that the electrode material forms a large number of primary cells in which the electrodes are very close together and in which a very vigorous electrolysis takes place. This electrolysis results in the usual reactions, gases being formed at the electrodes, and certain chemical changes taking place in the electrolyte, due to the introduction and formation of salts therein. Portions of the electrodes may be consumed and thus furnish a portion of these salts. When aluminum is used as one of the electrode materials, the electrolytic actions sets free aluminum hydroxid which is in colloidal form. The minute particles of this colloid form nuclei which collectively have an enormous surface upon which the impurities of the sugar solution are caught and fixed. This action can be enhanced in some cases if a supplemental solution of colloidal hydrous silicate of alumina be added to the treating chamber 14, and we provide for this purpose a pipe 50 controlled by a valve 51. We have also found it advantageous to add to the supplemental solution certain amounts of kieselguhr, diatomaceous earth, or other finely divided material, such material being hereinafter called the pulverulent material. By the use of such a supplemental solution the number of nuclei is increased, and the power of the solution to catch and fix the colloidal impurities of the sugar solution is greatly increased. In practice the sugar solution as it enters the decanting chamber 15 contains the aluminum hydrate and the aluminum silicate in the form of a flocculent mass in which the impurities are fixed. The pulverulent material not only increases the fixing power of the supplemental solution, but it also acts in a measure as a mechanical filter.

The sulfur dioxid gas superinduces on the above described reactions, and effects certain other useful chemical and physical actions. It greatly stimulates the electrolytic action due to a reduction in the resistance of the electrolyte, and in addition to the nascent hydrogen and other gases, produced as above mentioned, the $SO_2$ produces reactions which tend to reduce the coloring matter.

The solution from the decanting chamber 15 may be run into settling tanks in which the flocculent material is allowed to settle out, or this material with the impurities carried therein may be removed by filtration, or by any other convenient means.

We claim as our invention:—

1. The process of treating a solution which consists in passing the solution through a mass of electrode material consisting of two materials having different electrical potentials, and injecting sulfur dioxid into the solution carried in the mass of electrode material.

2. The process of treating a solution which consists in passing the solution through a mass of electrode material containing aluminum and a material having a different electrical polarity from aluminum, and injecting sulfur dioxid into the solution carried in the mass of electrode material.

3. The process of treating a solution which consists in passing the solution through a mass of electrode material consisting of two materials having different electrical potentials, said solution containing colloidal silicate of alumina.

4. The process of treating a solution which consists in passing the solution through a mass of electrode material containing aluminum and a material having a different electrical polarity from aluminum, said solution containing colloidal silicate of alumina.

5. The process of treating a solution which consists in passing the solution through a mass of electrode material consisting of two materials having different electrical potentials, and injecting sulfur dioxid into the solution carried in the mass of electrode material, said solution containing colloidal silicate of alumina.

6. The process of treating a solution which consists in passing the solution through a mass of electrode material containing aluminum and a material having a different electrical polarity from aluminum, and injecting sulfur dioxid into the solution carried in the mass of electrode material, said solution containing colloidal silicate of alumina.

7. The process of treating a solution which consists in passing the solution through a mass of electrode material consisting of two materials having different electrical potentials, said solution containing colloidal silicate of alumina, and a pulverulent material.

8. The process of treating a solution which consists in passing the solution through a mass of electrode material containing aluminum and a material having a different electrical polarity from aluminum, said solution containing colloidal silicate of alumina, and a pulverulent material.

9. The process of treating a solution which consists in passing the solution through a mass of electrode material consisting of two materials having different electrical potentials, and injecting sulfur dioxid into the solution carried in the mass of electrode material, said solution containing colloidal silicate of alumina, and a pulverulent material.

10. The process of treating a solution which consists in passing the solution through a mass of electrode material containing aluminum and a material having a different electrical polarity from aluminum, and injecting sulfur dioxid into the solution carried in the mass of electrode material, said solution containing colloidal silicate of alumina and a pulverulent material.

11. The process of treating a solution which consists in passing the solution through a mass of electrode material consisting of two materials having different electrical potentials, and injecting a gaseous reducing agent into the solution as it passes through said electrode material.

In testimony whereof, the said FREDERICK R. BACHLER has hereunto set his hand at San Francisco, California, this 10th day of December, 1915, and the said WILLIAM B. NEWKIRK has hereunto set his hand at Rocky Ford, Colorado, this 6 day of December, 1915.

FREDERICK R. BACHLER.
WILLIAM B. NEWKIRK.